April 28, 1970  J. P. POOLE ET AL  3,508,895
THERMOCHEMICAL METHOD OF STRENGTHENING GLASS
Filed March 27, 1967  2 Sheets-Sheet 1

INVENTOR.
JAMES P. POOLE
HERBERT C. SNYDER
ROBERT J. RYDER

INVENTOR.
JAMES P. POOLE
HERBERT C. SNYDER
ROBERT J. RYDER

United States Patent Office 3,508,895
Patented Apr. 28, 1970

3,508,895
THERMOCHEMICAL METHOD OF
STRENGTHENING GLASS
James P. Poole, Herbert C. Snyder, and Robert J. Ryder, Brockway, Pa., assignors to Brockway Glass Company, Inc., Brockway, Pa.
Continuation-in-part of application Ser. No. 545,250, Apr. 26, 1966, which is a continuation-in-part of application Ser. No. 318,069, Oct. 22, 1963. This application Mar. 27, 1967, Ser. No. 626,203
The portion of the term of the patent subsequent to Apr. 18, 1984, has been disclaimed
Int. Cl. C03c 21/00
U.S. Cl. 65—30
3 Claims

ABSTRACT OF THE DISCLOSURE

A method of strengthening glass bodies by increasing the viscosity of a surface layer of glass relative to the body as a whole whereby cooling of the body from the annealing range down through the strain points of the glass surface layer and the glass body produces a compressive stress in the surface layer. The surface layer viscosity is altered by substituting fluorine ions for oxygen and/or hydroxyl ions in the surface layer of glass to a sufficient depth to produce a surface layer of more viscous glass of a thickness sufficient to provide a compressive stress layer. Representative materials applied to the hot glass surface are fluoborates of tin, lead and zinc, stannous fluoride and titanium tetrafluoride.

BACKGROUND OF THE INVENTION

This application is a continuation-in-part of our copending application, Ser. No. 545,250, filed Apr. 26, 1966, now Patent No. 3,314,772, which is a continuation-in-part of application, Ser. No. 318,069, filed Oct. 22, 1963, now abandoned.

This invention relates to the strengthening of glass articles or bodies by producing a compressive stress layer at the surface of the glass.

It is well known in the glassmaking art that glass bodies are materially strengthened by treating the same to produce a compressive stress in a surface layer of the glass, such treatment being known in the art as tempering. The best known method of tempering glass is by thermal tempering wherein the glass is cooled rapidly from a temperature above its annealing point to a temperature below the strain point whereby the surface glass cools and sets before the interior glass. The subsequent cooling of the interior glass with its consequent shrinkage produces a compressive stress in the surface layer of glass with a balancing internal tensile stress. In thermal tempering the degree of tempering depends on the rate of cooling of the glass through the annealing and strain points and accordingly this cooling rate must be accurately controlled.

Glass is also tempered by chemical treatment wherein the surface layer of glass is modified chemically to alter its coefficient of expansion. The treatment of the surface layer of glass is effected above the strain point of the glass and is such as to reduce its coefficient of expansion as compared with the coefficient of expansion of the interior glass and accordingly, as the glass cools from a temperature above its strain point, the surface layer of glass tends to shrink less than the interior glass, whereby a tensile stress is developed in the glass body with a concomitant compressive stress in the surface layer. Chemical tempering of this type requires special glass formulation and is accordingly not practicable with ordinary soda-lime glasses such as are used in manufacturing containers and other relatively low cost glass articles. Furthermore, tempering according to this general method involves time factors and cooling control procedures similar to those required in conventional thermal tempering.

The amount of stress which can be developed by chemical tempering involving cation exchange is dependent upon the depth of the diffusion layer, which of course is a function of the diffusion time. In order to develop compressive stresses by this method which are significant enough to result in strength improvement, treatment times in the order of hours are necessary. This makes such a technique impractical for such glass items as containers and tubing which are normally produced at high rates of speed.

Still another glass tempering procedure consists in substituting, for surface ions of a glass body, ions of larger atomic diameter, the glass surface being thereby "packed" by the larger ions to produce a surface compressive stress. This substitution of larger ions for smaller ions at the glass surface must be effected below the strain point of the glass and after annealing, otherwise the "packing" effect of the larger ions would be neutralized by plastic flow in the glass body, just as internal strains are relieved in glass bodies by annealing.

This process is practiced by cation exchange (e.g. substitution of potassium ions for sodium ions of the glass) and is relatively slow and is not practical as a means of strengthening mass produced glass articles such as containers and glass tubing. Known methods of strengthening glass by chemical tempering to modify the coefficient of expansion in the surface layer of glass as described above are likewise accomplished by cation exchange.

SUMMARY OF THE INVENTION

The present invention provides a basically novel glass tempering procedure which comprises treatment of a surface layer of a glass body so as to increase the viscosity of such surface layer with respect to the interior glass. The annealing and strain point temperatures of glasses are determined by their viscosities, the annealing point being the temperature at which the glass has a viscosity of $10^{13.4}$ poises and the strain point being the temperature at which the glass has a viscosity of $10^{14.6}$ poises. Accordingly, increasing the viscosity of glass has the effect of raising its annealing and strain point temperatures.

From this it will be seen that in a glass body wherein a surface layer of glass is of higher viscosity than the interior glass, the surface layer will accordingly have higher annealing and strain point temperatures than the interior glass. Accordingly, when such glass is cooled through its two strain point temperatures (surface layer and interior), regardless of the cooling rate, the surface layer will reach its strain point temperature and thus set while the interior glass is still in the annealing range. Note that this is true even though the cooling rate is so slow that there is little or no difference between the instantaneous surface and internal temperatures of the glass body. Thus a substantially uniform tempering may be achieved even though the cooling rate in the case of a number of glass bodies or articles may vary substantially from one article to another.

The object of this invention is a method of strengthening a glass article by chemical treatment which produces an increase of viscosity of the glass in a layer at the surface of the article. This strengthening action is not dependent upon differences between the surface and bulk glass temperatures, nor differences between the expansion coefficient of the surface and bulk glass. For these reasons, this invention is a new and novel technique for creating desired stresses on glass objects during their fabrication.

DESCRIPTION OF A PREFERRED EMBODIMENT

Figure 1:
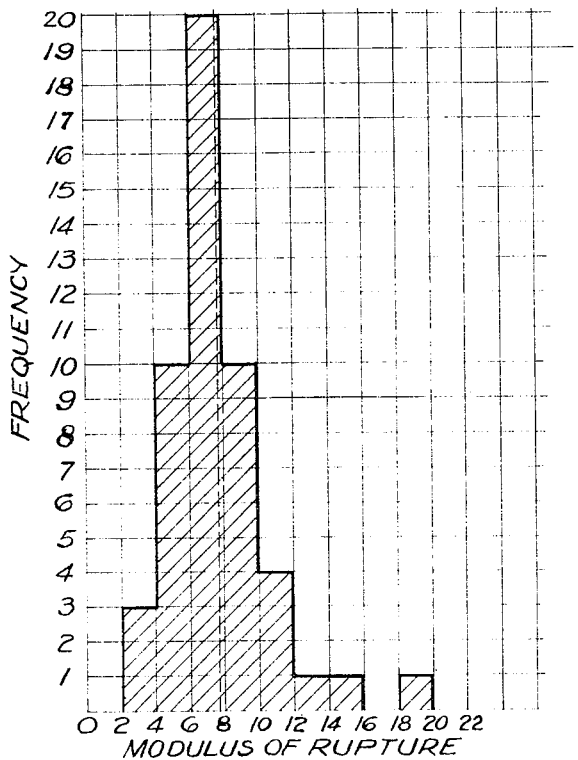
FIG. 1 is a bar graph showing breakage test results on a series of untreated glass tubes.

In the following representative mode of practicing the present invention the desired change in the viscosity of the surface layer of glass is effected by blowing or spraying a fluorine containing gas or liquid against a hot glass surface which results in anion exchange and thus produces a change in viscosity of the glass in a layer at the surface of a body or article. This reaction can be carried out rapidly (in minutes instead of hours), and thus lends itself to use in mass production of glass articles or bodies such as glass containers and glass tubing.

In order to attain the desired increase in viscosity of the surface layer of a glass body fluorine ions are substituted for non-bridging oxygen and/or hydroxyl ions and this substitution must be effected to a sufficient degree or to a sufficient depth from the glass surface to attain a layer of glass of increased viscosity to produce a compressive stress layer of sufficient thickness to materially strengthen the glass body. This application is to some extent an extension of the teachings of our prior copending application, Ser. No. 545,250 filed Apr. 26, 1966, which stands allowed. In that application the fluorine ion substitution is for the purpose of increasing the chemical durability of the glass surface and a substantial substitution of fluorine ions for the oxygen and hydroxyl ions at the surface of the glass may be achieved fairly readily without discernible etching of the glass surface.

However, producing a sufficiently deep fluorine ion substitution to produce an outer layer of glass of increased viscosity which is thick enough to provide a compressive surface layer of glass which materially strengthens the glass body is a problem of a different order and in fact presents difficulties not present in merely effecting ion exchange at the surface of the glass, as in chemical durability treatment. In fact, in the aforesaid surface treatment for imparting chemical durability the phenomenon of altered viscosity could not be recognized or determined due to the lack of measurable depth of the surface glass which has been subjected to fluorine ion exchange.

It is not feasible to merely increase the strength or intensity of the fluorine treatment since such a procedure will produce an etching of the glass surface which is not tolerable excepting in a few special cases.

We have found that a sufficient depth or degree of fluorine ion substitution to produce a material strengthening of the glass may be accomplished by subjecting the glass surface to intermittent repeated fluorine treatment or by subjecting it to continuous treatment at a slow controlled rate whereby etching is avoided and the fluorine substitution is intermittently or continuously effected as free oxygen or hydroxyl ions evolve at the glass surface or migrate thereto from the adjacent interior portions of the glass body. However, treatment in this manner, while effective, is so slow and time-consuming as to be usable only in circumstances where cost is not an important factor, i.e., in strengthening relatively expensive glass articles.

We have found that subjecting glass surfaces to certain metal fluorides produces a depth of fluorine ion substitution which results in a remarkable strengthening of the glass by the aforesaid increase in viscosity of the surface layer of glass. By the present treatment the fluorine-ion-substituted layer of glass is of such thickness as to increase the strength of the glass several-fold quickly and without etching.

The metal element of the treating substance does not enter into the surface layer reaction directly but is believed to serve as an "oxygen getter." In any event the metal, whether it evolves from the glass as an oxide or deposits on the glass surface, does not affect the basic object of fluorine ion substitution and appears to serve as a catalyst in making it possible to substitute fluorine ions for oxygen and for hydroxyl ions to a sufficient depth to produce a substantial surface layer of glass of greater viscosity than the main body of glass.

The exact theoretical function of the metal component is not certain but it is evident that applying fluorine in the form of a metal salt produces much deeper penetration and a more viscous glass layer in a small fraction of the time required when the fluorine is applied to the glass surface by other methods.

The fluorine salts which have been successfully employed in the present method are those of tin, zinc, lead and titanium. In most instances the treating materials have comprised fluoborates and, while excellent results have been obtained in these treatments, the function of the boron is not definitely known. In at least two instances good results have been obtained, as the following examples show, with stannous fluoride and titanium tetrafluoride.

Figure 2:
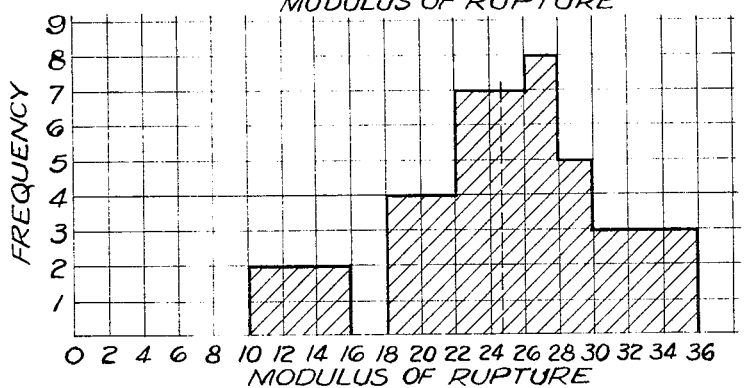
FIGS. 2 through 7 are bar graphs showing breakage test results on similar glass tubes treated in accordance with several embodiments of the present invention.
Figure 3:
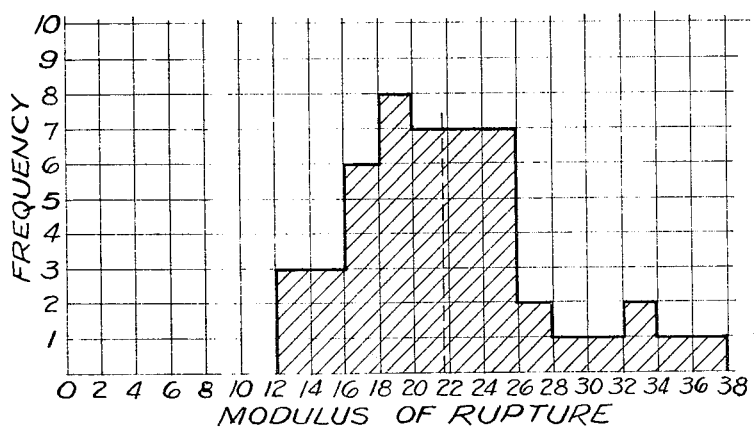
Figure 4:
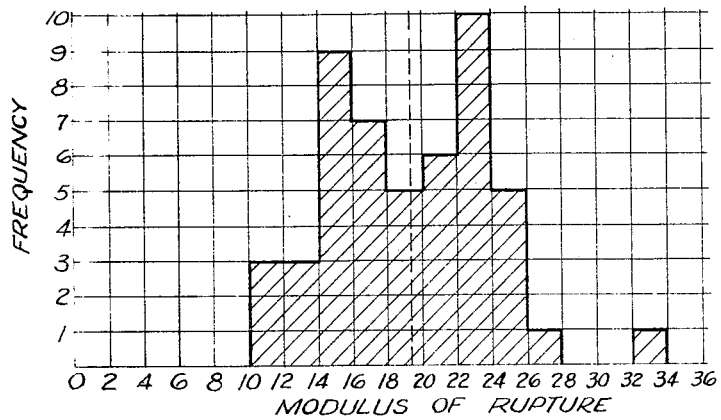
Figure 5:
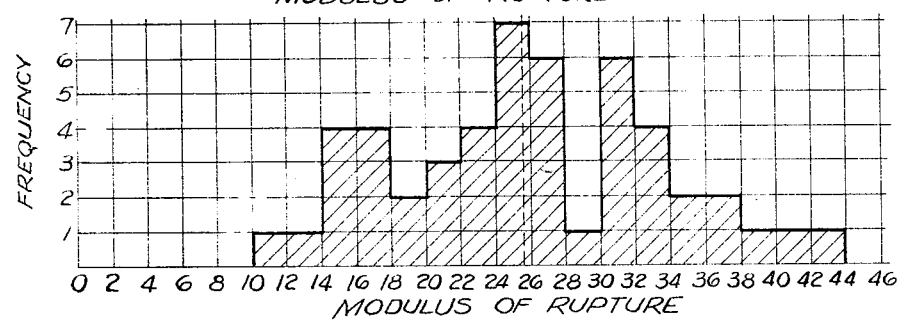
Figure 6:
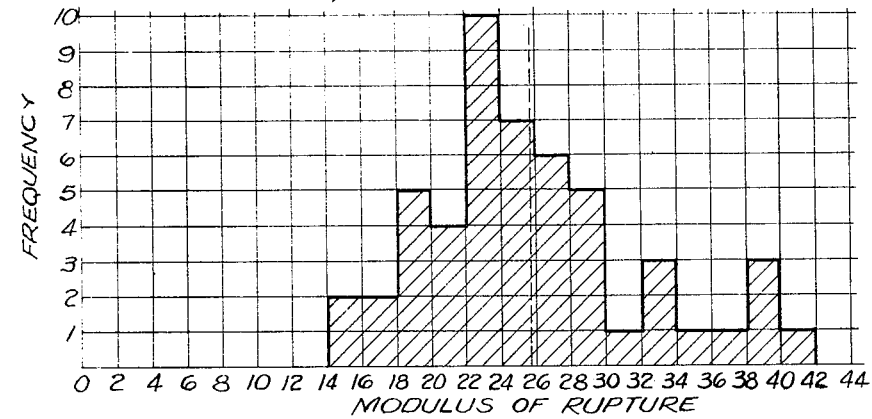
Figure 7:
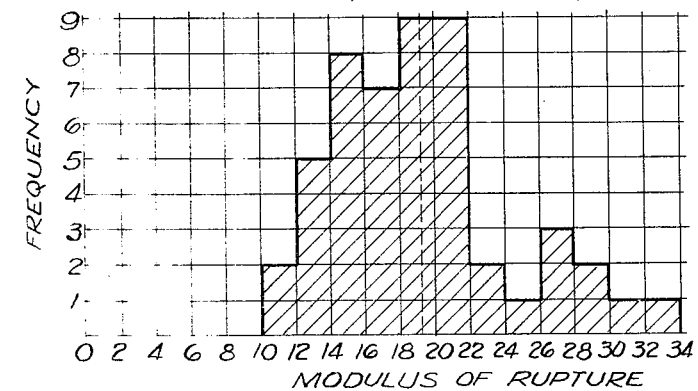

Reference will now be had to the specific strengthening treatments recorded, as to result, in the bar graphs, FIGS. 2 through 7. A series of glass tubes of soda lime glass, each 11.5 mm. in outside diameter with a wall thickness of .026 inch were each necked down centrally to produce stress concentration zones. These test pieces were variously treated as will be described later.

These test specimens were divided into sets of fifty each, one set being annealed and otherwise untreated to serve as controls. Six other sets were treated by applying spray solutions thereto for twenty seconds at a glass temperature of about 1200° F., the solutions employed being, referring to FIGS. 2 through 7 respectively, tin fluoborate, stannous fluoride, lead fluoborate, zinc fluoborate (as to both FIGS. 5 and 6), and titanium tetrafluoride.

After the foregoing spray applications to test pieces were immediately refired to raise the specimens to approximately their initial temperature to compensate for loss of heat during spraying and thereby complete the reaction of the spray material with the hot glass.

The several test specimens were then subjected to bending stress by applying loads to the central necked down portions of each and the modulus of rupture of each specimen was calculated using the usual formulae for simple beams of hollow cylindrical cross section with a centrally applied load.

The following is a summary of the strength test results, in terms of the average modulus of rupture, of the specimens referred to above and represented in FIGS. 1 through 7: by reason of the surface layer viscosity change of the present invention.

Conventional thermal tempering is not usually practical with thin walled glass and is more commonly used on thick walled glass bodies. The fluorine treatment of the present invention, however, is practicable without regard to the wall thickness of the glass and is accordingly of wider applicability than conventional thermal tempering and may effectively be practiced on thin or thick walled bodies. Furthermore, the present method produces a uniform compressive stress layer on glass bodies of irregular shapes where thermal tempering is either not practicable or produces stresses which are not uniformly distributed over the surface of the article.

| Flourine containing material: | Average modulus of rupture p.s.i. |
|---|---|
| Untreated annealed standard | 7632 |
| Tin fluoborate | 24568 |
| Stannous fluoride | 21776 |
| Lead fluoborate | 19247 |
| Zinc fluoborate (FIG. 5) | 25670 |
| Zinc fluoborate (FIG. 6) | 25812 |
| Titanium tetrafluoride | 19257 |

Polariscope examination of the treated specimens indicates compressive stress bands of between two and three microns in depth. The embodiments of the strengthening method of the present invention which are described above and test results of which are illustrated in FIGS. 2 through 7 were all made under annealing conditions, that is, the specimens after treatment were cooled at a slow enough rate to produce annealed glass and avoid any effects of conventional thermal tempering. Thus the strengthening effects indicated in the tests are due entirely to the change of viscosity in the surface layer as described above.

Glass subjected to the fluorine ion substitution of the present invention may also be cooled at a more rapid rate so as to produce conventional thermal tempering to augment the effect of the compressive surface layer produced.

What is claimed is:

1. A method of strengthening a sodalime glass body by producing a compressive layer of the order of at least 2 to 3 microns in depth at the surface of the body to strengthen the same, said layer having non-bridging oxygen ions and hydroxyl ions, which comprises increasing the viscosity of the glass in such layer as compared with the viscosity of the glass at the interior of the body by contacting the glass in such surface layer while said glass is at a temperature above its strain point with a fluorine-containing material to replace non-bridging oxygen and hydroxyl ions to a depth of the order of at least 2 to 3 microns in said surface layer with fluorine ions, whereby the surface layer of glass has a higher strain point temperature than the interior of the glass body, then cooling the glass through its two strain points whereby the surface layer of glass sets sooner than the interior glass to produce a compressive stress in the surface layer.

2. A method according to claim 1 wherein said increased viscosity is achieved by contacting the glass body with a fluoride salt of a metal of the class consisting of tin, lead, zinc and titanium, for a time sufficient to produce a substantial substitution of fluorine ions for oxygen and hydroxyl ions in said surface layer.

3. A method according to claim 1 wherein said increased viscosity is achieved by contacting the glass body with a fluoborate of a metal of the class consisting of tin, lead and zinc, for a time sufficient to produce a substantial substitution of fluorine ions for oxygen and hydroxyl ions in said surface layer.

References Cited

UNITED STATES PATENTS

| 2,982,053 | 5/1961 | Elmer | 65—30 |
| 3,314,772 | 4/1967 | Poole et al. | 65—30 |

S. LEON BASHORE, Primary Examiner

J. H. HARMAN, Assistant Examiner

U.S. Cl. X.R.

65—31; 156—15, 24